(12) United States Patent
Choi et al.

(10) Patent No.: US 10,050,499 B2
(45) Date of Patent: Aug. 14, 2018

(54) METHOD OF MANUFACTURING VOICE COIL

(71) Applicant: STS Semiconductor & Telecommunications Co., Ltd., Cheonan-si, Chungcheongnam-do (KR)

(72) Inventors: Jai Kyoung Choi, Busan (KR); Eun Dong Kim, Seoul (KR); Hyun Hak Jung, Cheonan-si (KR); Hyeong Min Kim, Hoengseong-gun (KR); Jong Hwi Jung, Cheonan-si (KR); Su Kyung Lim, Yeongju-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 327 days.

(21) Appl. No.: 14/940,255

(22) Filed: Nov. 13, 2015

(65) Prior Publication Data
US 2017/0047831 A1    Feb. 16, 2017

(30) Foreign Application Priority Data
Aug. 10, 2015  (KR) .................. 10-2015-0112670

(51) Int. Cl.
*H02K 15/04* (2006.01)
*C23F 1/00* (2006.01)
(Continued)

(52) U.S. Cl.
CPC ......... *H02K 15/0407* (2013.01); *H01F 41/04* (2013.01); *H01F 41/041* (2013.01);
(Continued)

(58) Field of Classification Search
CPC .. H02K 41/0354; H02K 15/0407; H02K 3/26; H04R 31/00; H01L 28/10;
(Continued)

(56) References Cited

U.S. PATENT DOCUMENTS

| 6,633,513 B1 | 10/2003 | Kim et al. |
| 2014/0049353 A1* | 2/2014 | Yoon .................. H01F 27/28 336/227 |

(Continued)

FOREIGN PATENT DOCUMENTS

| JP | 2007103716 A | 4/2007 |
| KR | 20010003589 A | 1/2001 |
| KR | 10-2004-0036868 A | 5/2004 |

*Primary Examiner* — Peter DungBa Vo
*Assistant Examiner* — Joshua D Anderson
(74) *Attorney, Agent, or Firm* — Renaissance IP Law Group LLP

(57) ABSTRACT

Provided is a method of manufacturing a voice coil, and more particularly, a method of manufacturing a voice coil in which a coil pattern is formed on a wafer level package. The method includes (a) forming a first coil pattern including a first area in which a first seed metal layer is exposed upward, a second area in which a first passivation layer for forming a via hole in the first area is formed, and a third area in which a first photoresist layer is formed in a portion of the first area and the second area on an upper surface of a wafer, (b) filling an inside of the via hole formed in the first coil pattern with a conductive material and forming first coil windings, and (c) removing the first photoresist layer formed in the third area.

10 Claims, 9 Drawing Sheets

(51) Int. Cl.
*H02K 41/035* (2006.01)
*H01F 41/04* (2006.01)
*H02K 3/26* (2006.01)
*H04R 9/00* (2006.01)
*H04R 31/00* (2006.01)

(52) U.S. Cl.
CPC ............... *H02K 3/26* (2013.01); *H04R 9/00* (2013.01); *H04R 31/00* (2013.01); *H02K 41/0356* (2013.01); *Y10T 29/49062* (2015.01)

(58) Field of Classification Search
CPC ...... H01F 42/042; H01F 41/04; H01F 41/041; H01F 41/042; H01F 41/043; H01F 41/12; H01F 41/122; H01F 41/125; H01F 41/127; G11B 7/22; Y10T 29/4906; Y10T 29/49062; Y10T 29/49064; Y10T 29/49073
See application file for complete search history.

(56) References Cited

U.S. PATENT DOCUMENTS

2015/0162744 A1* 6/2015 Liu .................. H01L 24/05
  361/111
2016/0225391 A1* 8/2016 Araki .................. G11B 5/3123

\* cited by examiner

METHOD OF MANUFACTURING VOICE COIL

CROSS-REFERENCE TO RELATED APPLICATION

This application claims priority to and the benefit of Korean Patent Application No. 10-2015-0112670, filed on Aug. 10, 2015, the disclosure of which is incorporated herein by reference in its entirety.

BACKGROUND

1. Field of the Invention

The present invention relates to a method of manufacturing a voice coil, and more particularly, to a method of manufacturing a voice coil in which a coil pattern is formed on a wafer level package.

2. Discussion of Related Art

Camera modules are divided into a voice coil motor (VCM) type, an encoder type, and a piezo type, and the VCM type module is being mostly applied in terms of cost-effectiveness. In the VCM among them, force which is proportional to the magnetic flux density of a permanent magnet magnetic field and current which flows through a coil is generated in a direction perpendicular to the magnetic field and the current to move a lens to an optimum position.

Meanwhile, when the VCM vertically moves along a cam structure by the rotation of an actuator, the separation of the lens from a focusing state occurs due to lens tilt, backlash, external shock, vibration, or the like. Therefore, in order to stably operate without vibration during the vertical movement, a spring having a preload for an autofocusing (AF) module is required. Using the spring, the lens is precisely guided and supported, the impact force that occurs when using a mobile phone is cushioned, and thus the lens is protected.

However, when the spring is permanently deformed due to shocks or the like, a driving tilt occurs and thus driving separation occurs in a diagonal direction rather than the vertical direction during the vertical movement. Accordingly, since the variation of images is generated left and right or up and down, it is difficult to obtain precise images.

Further, a coil applied to the VCM depends on maximum flux density. Accordingly, when the coil exceeds the maximum flux density, the coil reaches a magnetic saturation state, loses magnetism, and thus can be a simple wire. Therefore, when high maximum flux density is required, a volume to such a degree that the magnetic saturation of the coil does not occur is required.

Meanwhile, in a case of a coil winding applied to an optic image stabilizer (OIS) actuator, which is used as a shake compensator, or the like, a thickness thereof is large and a manufacturing method is limited, and thus it is difficult to implement a fine critical dimension. Further, it is disadvantageous that the efficiency of a degree of integration is decreased resulting from the above-described problems. When the corresponding coil winding is implemented to a device, it is advantageous that the volume of the camera module can be reduced. Specifically, in the VCM having a spring type, since the influence on the permanent deformation of the spring can be minimized, it is advantageous that reliability can be increased.

Therefore, it is necessary to implement the fine critical dimension by increasing the thickness of the coil winding applied to the actuator or the like. However, there is a limit to a conventional coil winding manufacturing method having a redistributed layer (RDL) type.

PRIOR ART DOCUMENT

Patent Literature

Korean Publication of Patent Application No. 10-2004-0036868

SUMMARY OF THE INVENTION

The present invention is directed to a method of manufacturing a voice coil in which a coil pattern is formed on a wafer level package.

Also, the present invention is directed to a method of manufacturing a voice coil in which a coil pattern is formed with a fine critical dimension.

Also, the present invention is directed to a method of manufacturing a voice coil in which a void that can be generated when a passivation layer is formed on a coil pattern is prevented from being generated since a plating process for the coil pattern is directly performed on the passivation layer.

The scope of the present invention is not limited to the above-described objects, and other unmentioned objects may be clearly understood by those skilled in the art from the following descriptions.

According to an aspect of the present invention, there is provided a method of manufacturing a voice coil, including: (a) forming a first coil pattern including a first area in which a first seed metal layer is exposed upward, a second area in which a first passivation layer for forming a via hole in the first area is formed, and a third area in which a first photoresist layer is formed in a portion of the first area and the second area on an upper surface of a wafer, (b) filling an inside of the via hole formed in the first coil pattern with a conductive material and forming first coil windings, and (c) removing the first photoresist layer formed in the third area.

Step (a) may include forming the first seed metal layer on the upper surface of the wafer, selectively removing the first seed metal layer formed in an area of the second area, forming the first passivation layer on surfaces of the wafer and the first seed metal layer, selectively removing the first passivation layer formed in areas other than the second area, and entirely forming the first photoresist layer on the first seed metal layer and the remaining first passivation layer, and selectively removing the first photoresist layer present on the first seed metal layer exposed upward through a photolithography process using a photo mask.

The selectively removing of the first passivation layer may include emitting light onto the first passivation layer through an opening of a photo mask by performing an exposure process using the photo mask, and solubilizing and removing only a portion of the first passivation layer to which the light is not emitted through the exposure process through a development process.

The method may further include (d) forming a second passivation layer which surrounds a surface of the wafer, a surface of the first passivation layer, and surfaces of the first coil windings, and the forming of the second passivation layer includes removing a portion of the second passivation layer so that an upper surface of at least one of the first coil windings is exposed.

The method may further include (e) forming a second coil pattern including a fourth area in which a second seed metal layer is exposed upward, a fifth area in which a third passivation layer for forming a via hole in the fourth area is formed, and a sixth area in which a second photoresist layer is formed in a portion of the fourth area and the fifth area on a surface of the second passivation layer, (f) filling an inside of the via hole formed in the second coil pattern with a conductive material and forming second coil windings, and (g) removing the second photoresist layer formed in the sixth area.

Step (e) may include forming the second seed metal layer on a surface of an area including a portion thereof which is exposed upward in the first coil windings, the second passivation layer, and the wafer, selectively removing the second seed metal layer formed in an area of the fifth area, forming the third passivation layer on an upper surface of an entire area including the remaining second seed metal layer, emitting light onto only an opening of a photo mask by performing an exposure process using the photo mask, solubilizing and removing only a portion of the third passivation layer to which the light is not emitted through the exposure process through a development process, and forming the second photoresist layer on a portion of the second seed metal layer and a portion of the remaining third passivation layer.

In this case, at least one of the second coil windings may be in contact with and electrically connected to at least one of the first coil windings.

The method may further include (h) forming a fourth passivation layer which surrounds a surface of the wafer, a surface of the second passivation layer, surfaces of the second coil windings, and a surface of the third passivation layer, and the forming of the fourth passivation layer includes removing a portion of the fourth passivation layer so that an upper surface of at least one of the second coil windings is exposed.

The method may further include (i) forming an external connection terminal in an area in which at least one of the second coil windings is exposed to an outside thereof by the removing of the portion of the fourth passivation layer.

Step (i) may include forming a third seed metal layer on a surface of an area including a portion thereof which is exposed upward in the second coil windings, the fourth passivation layer, and the wafer, forming a photoresist layer including an opening which exposes any winding of the second coil windings on the third seed metal layer, forming an under bump metallization (UBM) layer in the opening formed in the photoresist layer, coating the opening formed in the photoresist layer with a soldering metal and forming an external connection terminal, and removing the third seed metal layer remaining in areas other than an area in which the UBM layer is formed.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
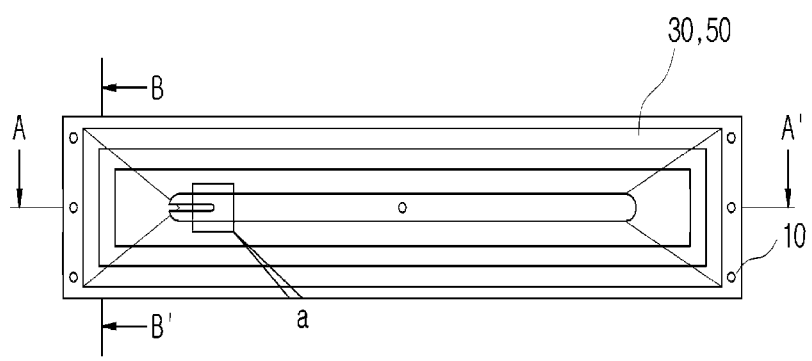
FIG. 1 is a plan view illustrating a voice coil according to an embodiment of the present invention.

Advantages and features of the present invention, and methods of achieving the same will be clearly understood with reference to the accompanying drawings and the following detailed embodiments. However the present invention is not limited to the embodiments to be disclosed, but may be implemented in various different forms. The embodiments are provided in order to fully describe the present invention and fully describe the scope of the present invention for those skilled in the art. The scope of the present invention is defined by the appended claims. Meanwhile, the terms used herein are provided to only describe embodiments of the present invention and not for purposes of limitation. Unless the context clearly indicates otherwise, the singular forms include the plural forms. It will be understood that the terms "comprises" or "comprising" when used herein, specify some stated components, steps, operations and/or elements, but do not preclude the presence or addition of one or more other components, steps, operations and/or elements.

Hereinafter, exemplary embodiments of the present invention will be described in detail with reference to the accompanying drawings. First, when reference numerals are assigned to elements of each drawing, if the same elements are illustrated in different drawings, the same reference numerals are assigned to the same elements whenever possible. Also, in descriptions of the present invention, when detailed descriptions of related known configurations or functions are deemed to unnecessarily obscure the gist of the present invention, they will be omitted.

Figure 2:
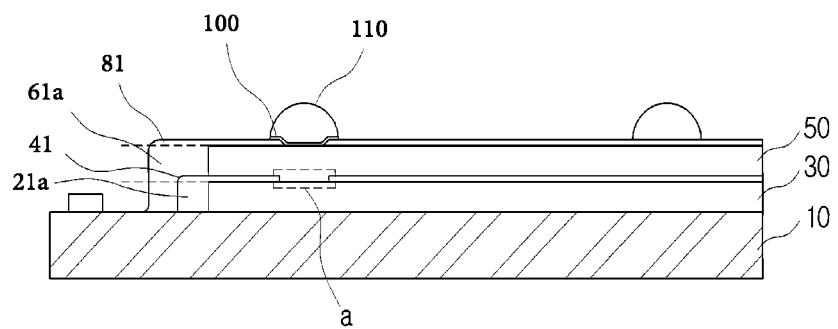
FIG. 2 is a cross-sectional view taken along line A-A' of FIG. 1.

FIG. 1 is a plan view illustrating a voice coil according to an embodiment of the present invention. FIG. 2 is a cross-sectional view taken along line A-A' of FIG. 1.

The present invention is directed to a structure of a voice coil manufactured at a wafer level and a method of manufacturing the same.

As illustrated in FIGS. 1 and 2, the voice coil of the present invention includes a wafer 10, a first passivation layer 21, a second passivation layer 22, a first coil winding 30, a third passivation layer 41, a fourth passivation layer 42, a second coil winding 50, and an external connection terminal 60.

The first passivation layer 21a is formed on the wafer 10 and provides a coil pattern for disposing the first coil winding 30 on the wafer 10. The first coil winding 30 may be disposed along the coil pattern formed on the first passivation layer 21a, and may be formed through a conventional plating process. Also, the second passivation layer 41 is formed on upper surfaces of the first passivation layer 21a and the first coil winding 30, and prevents the first coil winding 30 exposed to the air from being oxidized. In this case, a portion of the second passivation layer 41 is patterned and a portion of the first coil winding 30 is exposed. The exposed portion of the first coil winding 30 is connected to the second coil winding 50 to be described below so that the first coil winding 30 and the second coil winding 50 are electrically conductive.

The third passivation layer 61a is formed on the second passivation layer 41, and provides a coil pattern for stacking the second coil winding 50 on the first coil winding 30. The second coil winding 50 may be disposed along the coil pattern formed on the third passivation layer 61a, and may be formed through a conventional plating process. Also, the fourth passivation layer 81 is formed on upper surfaces of the third passivation layer 61a and the second coil winding 50, and prevents the second coil winding 50 exposed to the air from being oxidized. In this case, a portion of the fourth passivation layer 81 is patterned and a portion of the second coil winding 50 is exposed. The exposed portion of the second coil winding 50 is electrically connected to the external connection terminal 110. In this case, an under bump metallization (UBM) layer 100 is formed between the portion of the second coil winding 50 and the external connection terminal 110 to optimize the electrical contact resistance between the external connection terminal 110 and the second coil winding 50.

Hereinafter, a method of manufacturing the voice coil as described above will be described with reference to FIGS. 3 to 25. FIGS. 3 to 25 are cross-sectional views taken along line B-B' of FIG. 1 for describing a method of manufacturing a voice coil according to an embodiment of the present invention.

For convenience of description, although it is illustrated that only five coil windings are formed in FIGS. 3 to 25, it is merely used to describe exemplary embodiments. The present invention is not limited thereto.

Figure 3:
FIGS. 3 to 25 are cross-sectional views taken along line B-B' of FIG. 1 for describing a method of manufacturing a voice coil according to an embodiment of the present invention.

First, as illustrated in FIGS. 3, a process of entirely forming a first seed metal layer 11 on a wafer 10 is performed.

A silicon wafer, a glass wafer, a sapphire wafer, a gallium arsenide wafer and a variety may be used as the wafer 10.

The first seed metal layer 11 may be any metal as long as it can conduct electricity well and does not generate an intermetallic compound, but the present invention is not limited to a specific metal. However, the first seed metal layer 11 may be titanium (Ti) that can suppress diffusion between metals, or alloys thereof. The first seed metal layer 11 may be, for example, titanium alone, or may be a titanium-copper alloy, a titanium-tungsten-copper alloy, or the like. The first seed metal layer 11 may be formed, for example, by a sputtering method, a chemical vapor deposition method, or the like, but the present invention is not limited to a specific method.

Figure 4:
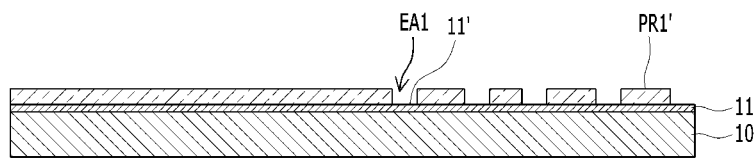
Figure 5:
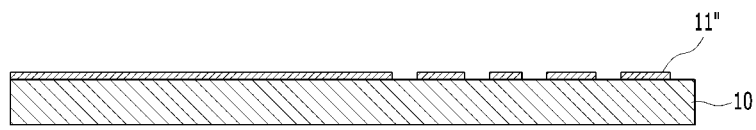

Next, referring to FIG. 4 and FIG. 5, a process of forming a first photoresist layer PR1 on the first seed metal layer 11 is performed. The first photoresist layer PR1 is entirely formed on the first seed metal layer 11, and an exposure area EA1 of the first photoresist layer PR1 is removed using an exposure process and a development process. Accordingly, the first seed metal layer 11' is exposed upward in the exposure area EA1 of the first photoresist layer PR1.

Next, a process of removing the first seed metal layer 11' exposed by the removal of the exposure area EA1 of the first photoresist layer PR1 is performed. A wet or dry etching method may be used as a method of removing the first seed metal layer 11', but the present invention is not limited to a specific method.

Then, a process of removing the first photoresist layer PR1' formed on the remaining first seed metal layer 11" is performed. A dry or wet etching method may be used as a method of removing the first photoresist layer PR1'. Accordingly, in only areas other than the exposure area EA1 of the first photoresist layer PR1, the first seed metal layer 11" remains on the wafer 10, and serves as a seed in a coil pattern plating process to be described below.

Figure 6:
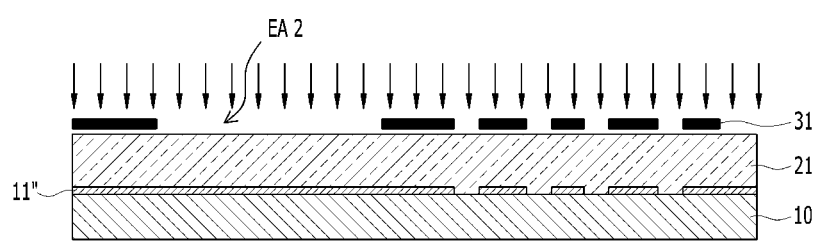

Next, referring to FIG. 6, a first passivation layer 21 is formed on an upper surface of an entire area including the wafer 10 and the first seed metal layer 11".

A coating or chemical vapor deposition method may be used as a method of forming the first passivation layer 21. The first passivation layer 21 is formed to have an appropriate thickness. In this case, the thickness may be adjusted according to a process parameter specified by the coating or chemical vapor deposition method. The first passivation layer 21 may be a polyimide (PI), benzocyclobutene (BCB), polybenzoxazole (PBO), bismaleimidetriazine (BT), a phenolic resin, epoxy, silicone, an oxide film ($SiO_2$), a nitride film ($Si_3N_4$), or a combination thereof.

Figure 7:
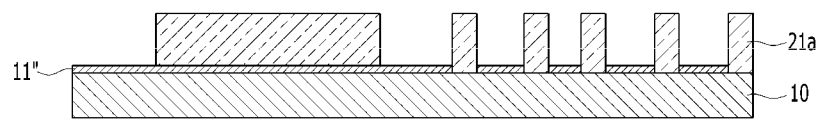

Also, by performing an exposure process using a photo mask 31, light may be emitted into only an opening EA2 of the photo mask 31. Then, only portions of the first passivation layer 21 to which the light is not emitted through the exposure process are solubilized and removed through a development process. As a result, as illustrated in FIG. 7, only portions of the first passivation layer 21 to which the light is emitted remain by the photo mask 31. Then, a coil pattern of a coil winding formed through a subsequent plating process is generated.

Figure 8:
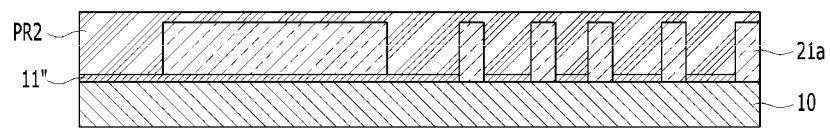

Next, as illustrated in FIG. 8, a process of forming a second photoresist layer PR2 on the first seed metal layer 11" and the remaining first passivation layer 21a is performed.

Figure 9:
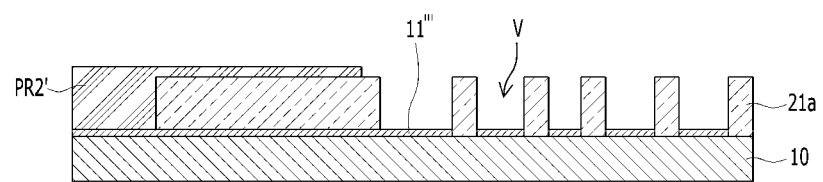

Also, as illustrated in FIG. 9, the second photoresist layer PR2 present on the first seed metal layer 11''' which is exposed upward is selectively removed through a photolithography process using a photo mask. Accordingly only a portion PR2' of the second photoresist layer PR2 remains. Only the first seed metal layer 11''' present in an area in which a coil winding is formed is exposed upward.

Figure 10:
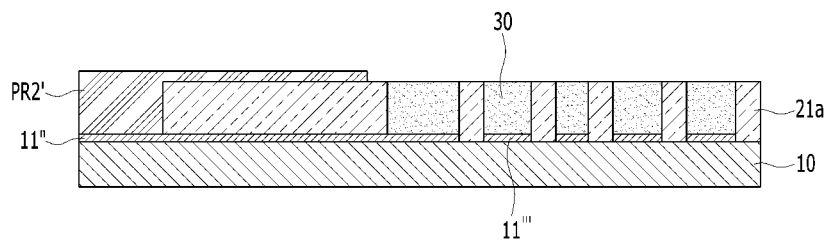
Figure 11:
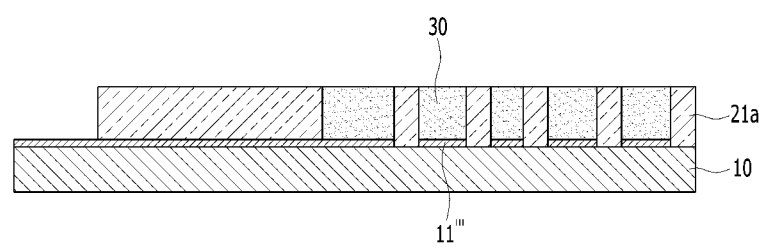

Next, as illustrated in FIG. 10 and FIG. 11, a process of filling insides of via holes V formed by the coil pattern which is formed by the first passivation layer 21a with a conductive material and forming first coil windings 30 is performed. The conductive material may be a metal or a metal post. An electroplating or electroless plating method may be used as a method of filling the insides of the via holes V with the metal or the metal post. In another embodiment, the conductive material may be a molten metal. The via holes V are filled with the molten metal, and then the molten metal is cooled and the first coil windings 30 may be formed. One end of the conductive material which fills the insides of the via holes V is exposed upward on an upper surface of the first passivation layer 21a.

Next, a process of removing the remaining second photoresist layer PR2' after the photolithography process described in FIG. 9 is performed. A dry or wet etching method may be used as a method of removing the second photoresist layer PR2'.

Then, a process of removing the first seed metal layer 11" exposed by the removal of the second photoresist layer PR2' is performed. A wet or dry etching method may be used as a method of removing the first seed metal layer 11", but the present invention is not limited to a specific method.

Figure 12:
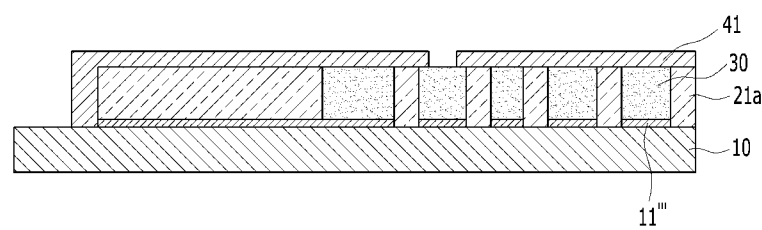

Next, as illustrated in FIG. 12, a process of forming a second passivation layer 41 which surrounds a surface of the wafer 10, a surface of the first passivation layer 21a, and surfaces of the first coil windings 30 is performed. In this case, a process of removing a portion of the second passivation layer 41 may be further performed so that an upper surface of at least one of the first coil windings 30 is exposed.

A coating or chemical vapor deposition method may be used as a method of forming the second passivation layer 41. The second passivation layer 41 is formed to have an appropriate thickness, and the thickness may be adjusted according to a process parameter specified by the coating or chemical vapor deposition method. The second passivation layer 41 may be a polyimide (PI), benzocyclobutene (BCB), polybenzoxazole (PBO), bismaleimidetriazine (BT), a phenolic resin, epoxy, silicone, an oxide film (SiO$_2$), a nitride film (Si$_3$N$_4$), or a combination thereof.

Also, by performing an exposure process using a photo mask, light may be emitted into only an opening of the photo mask. Then, only a portion of the second passivation layer 41 to which the light is emitted through the exposure process is solubilized and removed through a development process. As a result, as illustrated in FIG. 12, only an upper surface of any one of the first coil windings 30 is exposed.

Figure 13:
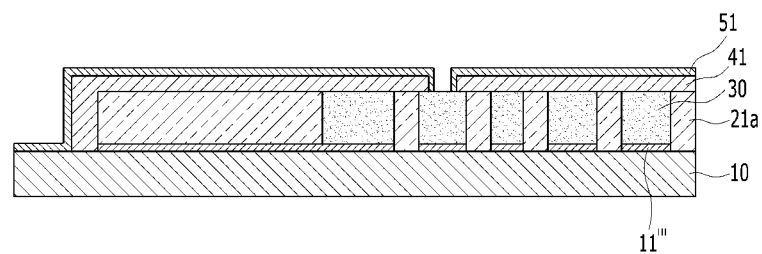

Next, as illustrated in FIG. 13, a process of forming a second seed metal layer 51 on a surface of an area including a portion thereof which is exposed upward in the first coil winding 30, the second passivation layer 41, and the wafer 10 is performed.

The second seed metal layer 51 may be any metal as long as it can conduct electricity well and does not generate an intermetallic compound, but the present invention is not limited to a specific metal. However, the second seed metal layer 51 may be titanium (Ti) that can suppress diffusion between metals, or alloys thereof. For example, the second seed metal layer 51 may be titanium (Ti) alone, or may be a titanium-copper alloy, a titanium-tungsten-copper alloy, or the like. The second seed metal layer 51 may be formed, for example, by a sputtering method, a chemical vapor deposition method, or the like, but the present invention is not limited to a specific method.

Figure 14:
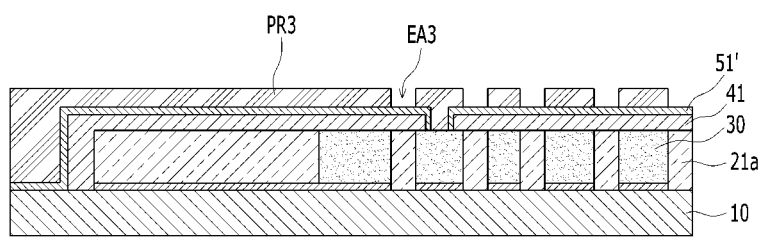

Next, as illustrated in FIG. 13 and FIG. 14, a process of forming a third photoresist layer PR3 on the second seed metal layer 51' is performed. The third photoresist layer PR3 is entirely formed on the second seed metal layer 51', and an exposure area EA3 of the third photoresist layer PR3 is removed using an exposure process and a development process. Accordingly, the second seed metal layer 51' is exposed upward in the exposure area EA3 of the third photoresist layer PR3.

Figure 15:
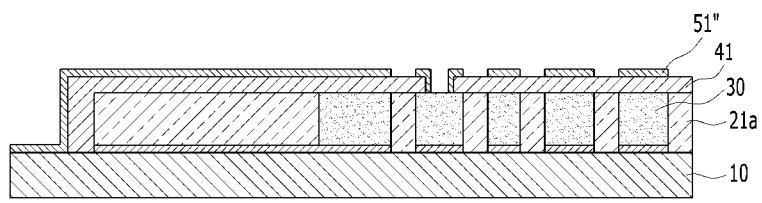

Next, as illustrated in FIG. 14 and FIG. 15, a process of removing the second seed metal layer 51' exposed by the removal of the exposure area EA3 of the third photoresist layer PR3 is performed. A wet or dry etching method may be used as a method of removing the second seed metal layer 51', but the present invention is not limited to a specific method.

Then, a process of removing the third photoresist layer PR3 formed on the second seed metal layer 51" is performed. A dry or wet etching method may be used as a method of removing the third photoresist layer PR3. Accordingly, in only areas other than the exposure area EA3 of the third photoresist layer PR3, the second seed metal layer 51" remains on the second passivation layer 41, and serves as a seed in a coil pattern plating process to be described below.

Figure 16:
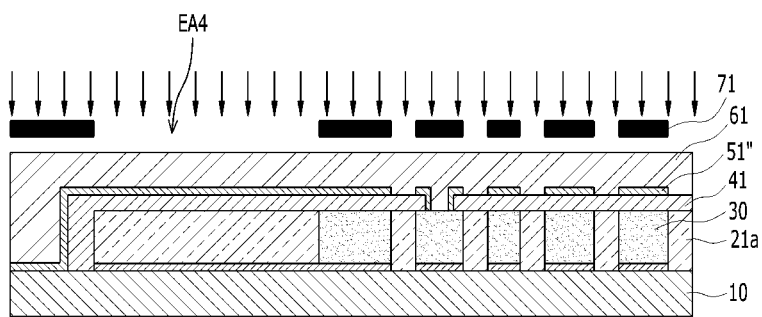

Next, as illustrated in FIG. 16, a third passivation layer 61 is formed on an upper surface of an entire area including the second seed metal layer 51".

A coating or chemical vapor deposition method may be used as a method of forming the third passivation layer 61. The third passivation layer 61 is formed to have an appropriate thickness. In this case, the thickness may be adjusted according to a process parameter specified by the coating or chemical vapor deposition method. The third passivation layer 61 may be a polyimide (PI), benzocyclobutene (BCB), polybenzoxazole (PBO), bismaleimidetriazine (BT), a phenolic resin, epoxy, silicone, an oxide film (SiO$_2$), a nitride film (Si$_3$N$_4$), or a combination thereof.

Figure 17:
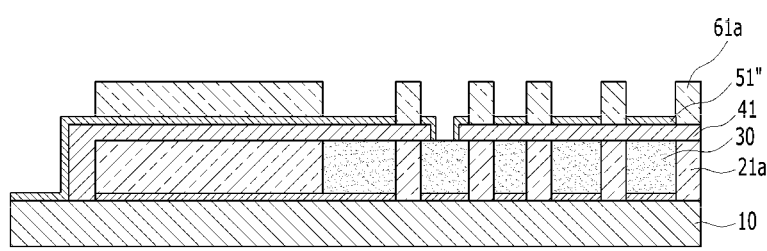

Also, by performing an exposure process using a photo mask 71, light may be emitted into only an opening EA4 of the photo mask 71. Then, only portions of the third passivation layer 61 to which the light is not emitted through the exposure process are solubilized and removed through a development process. As a result, as illustrated in FIG. 17, only portions of the third passivation layer 61 to which the light is emitted remain by the photo mask 71, and then a coil pattern 61a of a coil winding formed through a subsequent plating process is generated.

Figure 18:
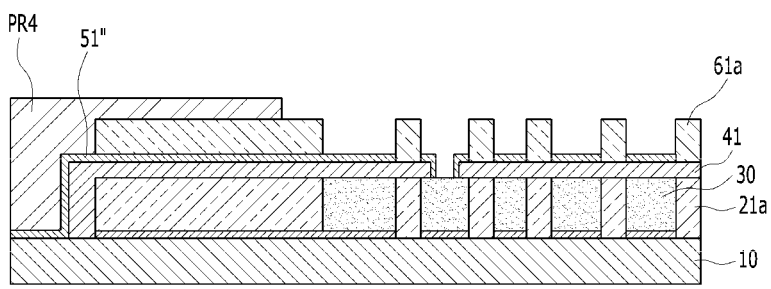

Next, as illustrated in FIG. 18, a process of forming a fourth photoresist layer PR4 on a portion of the second seed metal layer 51" and the remaining third passivation layer 61a is performed.

Figure 19:
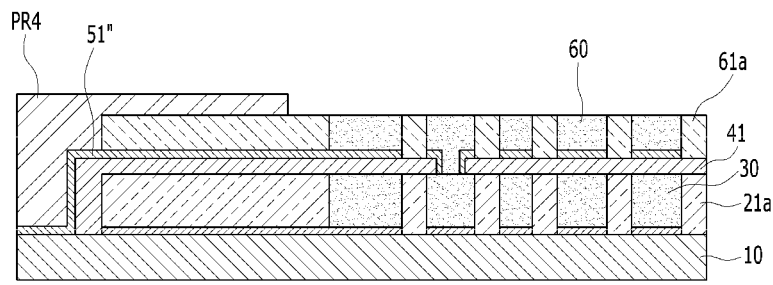

Next, as illustrated in FIG. 19, a process of filling insides of via holes V formed by the coil pattern 61a with a conductive material and forming second coil windings 60 is performed. The conductive material may be a metal or a metal post. An electroplating or electroless plating method may be used as a method of filling the insides the via holes V with the metal or the metal post. In another embodiment, the conductive material may be a molten metal. The via holes V are filled with the molten metal, and then the molten metal is cooled and the second coil windings 60 may be formed. One end of the conductive material which fills the insides of the via holes V is exposed upward on an upper surface of the third passivation layer 61.

In this case, at least one of the second coil windings 60 is in contact with and is electrically connected to the first coil windings 30.

Figure 20:
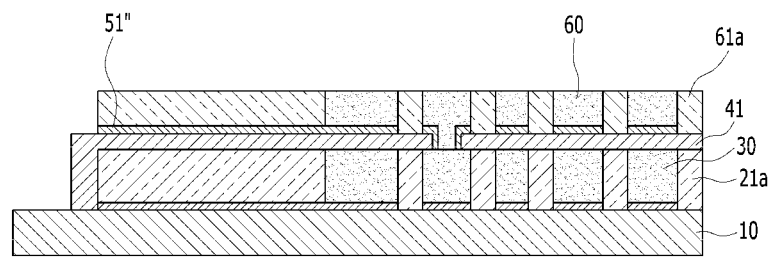

Next, as illustrated in FIG. 20, a process of removing the fourth photoresist layer PR4 is performed. A dry or wet etching method may be used as a method of removing the fourth photoresist layer PR4.

Also, a process of removing the second seed metal layer 51" exposed by the removal of the fourth photoresist layer PR4 is performed. A wet or dry etching method may be used as a method of removing the second seed metal layer 51", but the present invention is not limited to a specific method.

Figure 21:
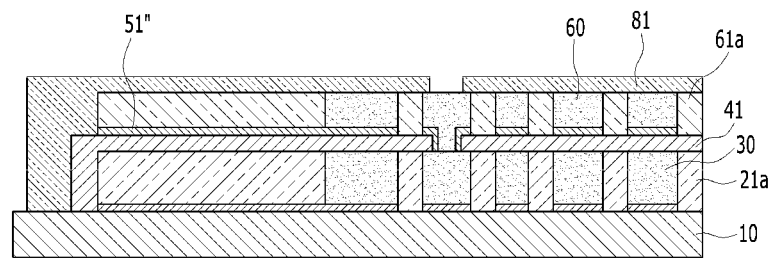

Next, as illustrated in FIG. 21, a process of forming a fourth passivation layer 81 which surrounds a surface of the wafer 10, a surface of the second passivation layer 41, surfaces of the second coil windings 60, and a surface of the third passivation layer 61 is performed. In this case, a process of removing a portion of the fourth passivation layer 81 may be further performed so that an upper surface of at least one of the second coil windings 60 is exposed.

A coating or chemical vapor deposition method may be used as a method of forming the fourth passivation layer 81. The fourth passivation layer 81 is formed to have an appropriate thickness, and the thickness may be adjusted according to a process parameter specified by the coating or chemical vapor deposition method. The fourth passivation layer 81 may be a polyimide (PI), benzocyclobutene (BCB), polybenzoxazole (PBO), bismaleimidetriazine (BT), a phenolic resin, epoxy, silicone, an oxide film (SiO$_2$), a nitride film (Si$_3$N$_4$), or a combination thereof.

Also, by performing an exposure process using a photo mask, light may be emitted into only an opening of the photo mask. Then, only a portion of the fourth passivation layer 81 to which light is emitted through the exposure process is solubilized and removed through a development process. As a result, as illustrated in FIG. 21, only an upper surface of any one of the second coil windings 60 is exposed.

Figure 22:
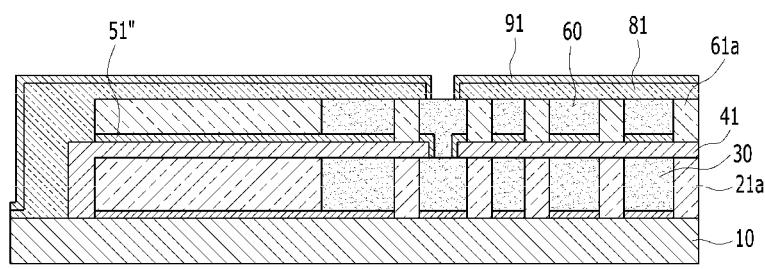

Next, as illustrated in FIG. 22, a process of forming a third seed metal layer 91 on a surface of an area including a portion thereof which is exposed upward in the second coil winding 60, the fourth passivation layer 81, and the wafer 10 is performed.

The third seed metal layer 91 may be any metal as long as it can conduct electricity well and does not generate an intermetallic compound, but the present invention is not limited to a specific metal. However, the third seed metal layer 91 may be titanium (Ti) that can suppress diffusion between metals, or alloys thereof. For example, the third seed metal layer 91 may be titanium (Ti) alone, or may be a titanium-copper alloy, a titanium-tungsten-copper alloy, or the like. The third seed metal layer 91 may be formed, for example, by a sputtering method, a chemical vapor deposition method, or the like, but the present invention is not limited to a specific method.

Figure 23:
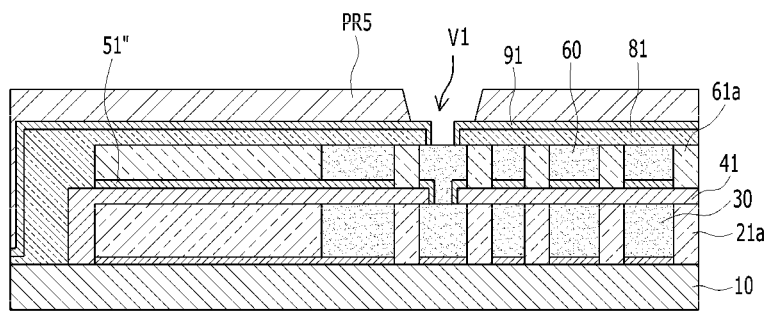
Figure 24:
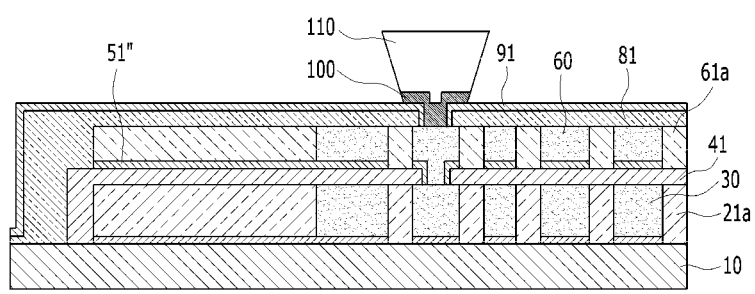

Next, as illustrated in FIG. 23 a fifth photoresist layer PR5 including an opening V1 which exposes a portion of the second coil winding 60 is formed in the third seed metal layer 91. As illustrated in FIG. 24, an UBM layer 100 is formed in the opening V1 formed in the fifth photoresist layer PR5. An electroless plating or electroplating method may be used as a method of forming the UBM layer 100.

Figure 25:
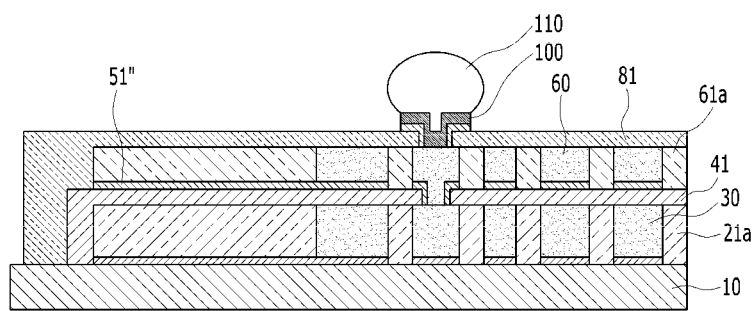

The electrical contact resistance between an external connection terminal 110 and the second coil winding 60 is optimized through a process of coating the opening V1 formed in the fifth photoresist layer PR5 with a soldering metal. In this case, the external connection terminal 110 may be a bump, and may include gold, silver, copper, tin, or nickel. Further, as illustrated in FIG. 25, by performing a reflow process, an electrical connection between the second coil winding 60 and the external connection terminal 110 may be improved. A process of removing the third seed metal layer 91 remaining in areas other than an area in which the UBM layer 100 is formed is performed. A wet or dry etching method may be used as a method of removing the third seed metal layer 91, but the present invention is not limited to a specific method.

Meanwhile, although it is illustrated that the UBM layer 100 and the external connection terminal 110 are formed using the opening V1 formed in the fifth photoresist layer PR5 in FIGS. 23 and 24, the present invention is not limited thereto. Therefore, without using a photolithography process, the external connection terminal 110 may also be formed through a process of attaching a solder ball or the like onto the third seed metal layer 91 formed in an area including a portion thereof which is exposed upward in the second coil winding 60.

As described above, according to the present invention, a bridge between coil windings can be prevented from being generated while a coil is formed to have a large thickness, and a coil pattern can be formed with a fine critical dimension.

Further, since a plating process for the coil pattern is directly performed on a passivation layer, a void that can be generated when the passivation layer is formed on the coil pattern can be prevented from being generated.

It will be understood by those skilled in the art that various modifications can be made without departing from the scope of the present invention and without changing essential features. Therefore, the above-described embodiments should be considered in a descriptive sense only and not for purposes of limitation. The scope of the present invention is defined not by the detailed description but by the appended claims, and encompasses all modifications or alterations derived from meanings, the scope and equivalents of the appended claims.

What is claimed is:

1. A method of manufacturing a voice coil on a wafer, comprising:
   forming a first passivation layer on a first metal seed layer provided on a wafer;
   patterning the first passivation layer to form a first coil pattern, the first coil pattern including a first via hole in which a first portion of the first metal seed layer is exposed by the first passivation layer, wherein a second portion of the first metal seed layer is exposed by the first passivation layer and is outside the first via hole;
   forming a first photoresist layer on a portion of the first passivation layer and the second portion of the first metal seed layer, wherein the first via hole is exposed by the first photoresist layer;
   filling an inside of the first via hole with a conductive material to form first coil windings; and
   after forming the first coil windings, selectively removing the first photoresist layer relative to the first passivation layer.

2. The method of claim 1, wherein:
   the first seed metal layer is formed on an upper surface of the wafer and a portion of the wafer is exposed by the first metal seed layer,
   the first passivation layer is formed on the upper surface of the wafer and an upper surface of the first seed metal layer and patterning the first passivation layer includes selectively removing a portion of the first passivation layer formed on the upper surface of the wafer; and
   forming the first photoresist layer includes forming the first photoresist layer on the first seed metal layer and the first passivation layer, and selectively removing a portion of the first photoresist layer present on the first seed metal layer.

3. The method of claim 2, wherein the selectively removing of the portion of the first passivation layer includes:
   emitting light onto the first passivation layer through an opening of a photo mask by performing an exposure process using the photo mask; and
   solubilizing and removing only a portion of the first passivation layer to which the light is not emitted through the exposure process through a development process.

4. The method of claim 1, further comprising:
   forming a second passivation layer on a surface of the first passivation layer and on upper surfaces of the first coil windings; and
   removing a portion of the second passivation layer so that an upper surface of at least one of the first coil windings is exposed.

5. The method of claim 4, further comprising:
   forming a second seed metal layer on the second passivation layer;
   forming a third passivation layer on the second metal seed layer;
   patterning the third passivation layer to form a second coil pattern, the second coil pattern including a second via hole in which a first portion of the second metal seed layer is exposed, wherein a second portion of the second metal seed layer is exposed by the third passivation layer and is outside the second via hole;
   forming a second photoresist layer on a portion of the third passivation layer and the second portion of the second metal seed layer, wherein the second via hole is exposed by the second photoresist layer;
   filling an inside of the second via hole with a conductive material to form second coil windings; and
   after forming the second coil windings, removing the second photoresist layer.

6. The method of claim 5, wherein:
   the second seed metal layer is formed on the upper surface of the at least one first coil winding, the second passivation layer, and the wafer and a portion of the upper surface of the at least one first coil winding is exposed by the second seed metal layer; and the third passivation layer is formed on an upper surface of the second seed metal layer and patterning the third passivation layer includes;

emitting light onto only an opening of a photo mask by performing an exposure process using the photo mask; and solubilizing and removing only a portion of the third passivation layer to which the light is not emitted through the exposure process through a development process; and forming the second photoresist layer on a portion of the second seed metal layer and a portion of the remaining third passivation layer.

7. The method of claim 5, wherein at least one of the second coil windings is in contact with and is electrically connected to at least one of the first coil windings.

8. The method of claim 5, further comprising:

forming a fourth passivation layer on the upper surface of the wafer, a surface of the second passivation layer, surfaces of the second coil windings, and a surface of the third passivation layer; and removing a portion of the fourth passivation layer so that an upper surface of at least one of the second coil windings is exposed.

9. The method of claim 8, further comprising forming an external connection terminal on the exposed upper surface of the at least one of the second coil windings.

10. The method of claim 9, wherein forming the external connection terminal includes:

forming a third seed metal layer on the upper surface of the at least one of the second coil windings, the fourth passivation layer, and the wafer;

forming a third photoresist layer on the third seed metal layer, the third photoresist layer including an opening configured to expose any winding of the second coil windings;

forming an under bump metallization (UBM) layer in the opening formed in the third photoresist layer;

coating the opening formed in the third photoresist layer with a soldering metal; and removing the third seed metal layer remaining in areas other than an area in which the UBM layer is formed.

* * * * *